(12) United States Patent
Schmid et al.

(10) Patent No.: US 6,655,211 B1
(45) Date of Patent: Dec. 2, 2003

(54) PIEZOELECTRIC ACCELEROMETER WITH LATERALLY STABILIZING ELEMENT

(75) Inventors: Felix Schmid, Belfaux (CH); Bernard Broillet, Misery (CH); Nicolas Clement, Villars-sur-Glâne (CH); Benoît Maillard, Givisiez (CH)

(73) Assignee: Vibro-Meter SA (CH)

( * ) Notice: Subject to any disclaimer, the term of this patent is extended or adjusted under 35 U.S.C. 154(b) by 0 days.

(21) Appl. No.: 09/562,156

(22) Filed: May 1, 2000

(30) Foreign Application Priority Data

Mar. 8, 2000 (EP) .............................. 00810194

(51) Int. Cl.⁷ .......................... G01P 15/09; H01L 41/08
(52) U.S. Cl. .................... 73/514.34; 310/329
(58) Field of Search ................. 73/514.34, 514.16, 73/514.29, 649, 652, 654, 715, 723, 726, 727, 862.581, 862.381, 862.621, 862.625, 862.627, 862.628; 310/329, 333, 338

(56) References Cited

U.S. PATENT DOCUMENTS

| | | | |
|---|---|---|---|
| 3,285,074 A | * 11/1966 | Elazar | 73/514.34 |
| 3,646,818 A | * 3/1972 | Little et al. | 73/514.16 |
| 4,359,658 A | 11/1982 | Cartier | 310/129 |
| 4,586,377 A | * 5/1986 | Schmid | 73/514.34 |
| 5,661,361 A | * 8/1997 | Lysen | 73/514.34 |
| 6,105,434 A | 8/2000 | Engeler | 73/702 |

FOREIGN PATENT DOCUMENTS

| | | |
|---|---|---|
| FR | 772835 | 11/1934 |
| FR | 1197092 | 11/1959 |
| SU | 667926 | 8/1980 |

* cited by examiner

Primary Examiner—Helen Kwok
(74) Attorney, Agent, or Firm—Ostrolenk, Faber, Gerb & Soffen, LLP

(57) ABSTRACT

The seismic mass (4) of an accelerometer that comprises at least one electromechanical transducer is stabilized in the direction perpendicular to the sensible axis by at least one laterally stabilizing element (8) arranged between the electromechanical transducer (9) and a structural element (7). This stabilization eliminates or at least drastically reduces any distortions of the measurement results provoked by transversal accelerations.

20 Claims, 5 Drawing Sheets

PIEZOELECTRIC ACCELEROMETER WITH LATERALLY STABILIZING ELEMENT

FIELD OF THE INVENTION

The present invention relates to an accelerometer comprising a supporting base and at least one electromechanical transducer constituted of at least one sensitive element, each of said at least one sensitive element comprising at least one piezoelectric element, the whole being arranged between said supporting base and a seismic mass.

BACKGROUND OF THE INVENTION

It is known to use piezoelectric accelerometers for measuring the vibrations of rotating machines such as gas turbines or jet engines. Among the known basic principles used for the design of accelerometers, there are two that are the most frequently used, namely, the shear mode design and the compression mode design. The compression mode designs can be split in two subgroups. A first subgroup using a pure compression of the piezoelectric material (i.e. $d_{33}$, $d_{11}$ or $d_{22}$ mode) whereas a second subgroup uses the transverse compression of the piezoelectric material (i.e. $d_{31}$, $d_{21}$, $d_{32}$, $d_{23}$, $d_{13}$, $d_{12}$ mode). These two basic designs use at least one seismic mass which, under the effect of the acceleration generated by the vibrations, acts upon one or more piezoelectric elements.

In the shear mode accelerometer design, a deformation of the piezoelectric elements produced by a shear force is used for producing an electric charge, whereas in the compression mode accelerometer design, a longitudinal compression of the piezoelectric elements in the direction of the sensitive axis produces an electric charge.

Each one of these two basic accelerometer designs has advantages and limitations for the design engineer, but also in the practical implementation. Shear mode accelerometers can be very small devices for a given sensitivity, but have a lower resonance frequency. Compression mode accelerometers are known to be suitable for applications which require a high resonance frequency. In view of the piezoelectric properties of certain materials, design engineers prefer compression mode accelerometers for high temperature applications.

Serious problems may arise when piezoelectric accelerometers are excited by high vibration levels in the transverse axis, i.e. in a direction normal to the sensitive axis. This problem is encountered more specifically when the transversal vibration excitation frequency coincides with the transversal resonance of the transducer whereby the movement is amplified. Under these conditions, the bending stress on the piezoelectric elements can produce a significant noise in the output signal to such an extent that this output signal is substantially corrupted. In the past, this phenomenon has very often not been correctly understood, and the results could be interpreted as a pyroelectric effect or an effect of a sensitivity to strain of the supporting base (base strain).

SUMMARY OF THE INVENTION

The main aim of the invention is to overcome the above-indicated problems and to provide an accelerometer having a structure that eliminates or at least substantially reduces the influence of transversal accelerations on the accuracy of the measurement results.

Another important and essential aim of the invention is in particular to provide a compression mode accelerometer having a structure that eliminates or at least substantially reduces the influence of transversal accelerations on the accuracy of vibration signal provided by the accelerometer.

According to the invention the above aims are attained with an accelerometer comprising:

- a supporting base,
- at least one electromechanical transducer each of which is fastened on said supporting base, and each of which includes at least one seismic mass, and at least one sensitive element, each such sensitive element comprising at least one piezoelectric element,
- a structural element which is rigidly connected to said supporting base, and
- at least one laterally stabilizing element which is in mechanical contact with said at least one electromechanical transducer and with said structural element.

In a preferred embodiment of an accelerometer according to the invention, the laterally stabilizing element is substantially more rigid in radial than in axial direction. The above mentioned structural element may constitute a part of an accelerometer housing which housing is rigidly fastened to the supporting base.

Further special or preferred features of the present invention will be disclosed and emphasized in the following detailed description of embodiments thereof, and in the dependent claims.

The invention is applicable to all basic designs of accelerometers but it is useful in particular for compression mode accelerometers (the basic structure of this type of accelerometer is shown by FIG. 1).

DETAILED DESCRIPTION OF THE INVENTION

Figure 1:
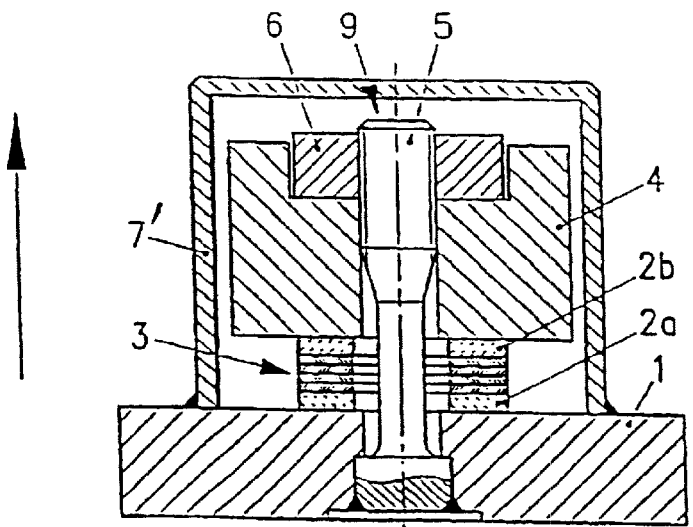
FIG. 1 schematically shows the basic structure of a typical, known piezoelectric accelerometer in compression mode.

FIG. 1 shows the basic structure of a known, compression ode accelerometer. This accelerometer comprises an electromechanical transducer 9 which is fastened on a supporting base 1. The electromechanical transducer 9 comprises a sensitive element 3, constituted by one or more piezoelectric elements mounted between two insulating elements 2a, 2b, a seismic mass 4 mounted on upper insulating element 2b, a central bolt 5 and a nut 6. The electrodes (not shown for the sake of clarity) which serve for collecting electric charge are disposed between the piezoelectric elements. The electromechanical transducer 9 comprising the components just mentioned is fastened on the supporting base 1 by means of the central bolt 5 and the nut 6. The bolt 5 is prestressed for avoiding any displacement of the components of the electromechanical transducer 9 under all conditions of use. Instead of the prestressed bolt 5, the components of the electromechanical transducer may also be glued, welded or fastened in any other suitable way. The electromechanical transducer 9 is mounted in a housing 7' which is rigidly fastened to the supporting base 1, e.g. by welding.

An accelerometer of the type represented in FIG. 1 is fastened through its supporting base 1 on the surface of an object by means of a fixation device (not shown) in order to measure vibrations of that surface.

In all enclosed drawings the direction of the sensitive axis of the accelerometer is indicated by an arrow represented on the left of each of FIGS. 1 to 4e, and said arrow is parallel to said sensitive axis.

Under the action of vibrations in the direction of the sensitive axis of the accelerometer, the seismic mass 4, situated at the free end of the electromechanical transducer 9, generates compression and decompression forces against the supporting base 1 and also on the piezoelectric elements which, in turn, generate electrical charges representative of the measurement signal. The accelerometer functions correctly as long as the decompression forces, including a engineering margin, remain weaker than the prestressing force of the central bolt.

Under the action of vibrations in the direction perpendicular to the sensitive axis, the free end of the electromechanical transducer 9 will bend laterally in the direction of the excitation. The maximum bending stress experienced by the piezoelectric elements may be very high and is typically higher than the compression stress under the same magnitude of acceleration in the direction of the sensitive axis. This bending effect may lead to an important distortion of the vibration signal, in particular when the frequency of the vibration excitation coincides with the bending resonance frequency of the assembly.

Figure 2A:
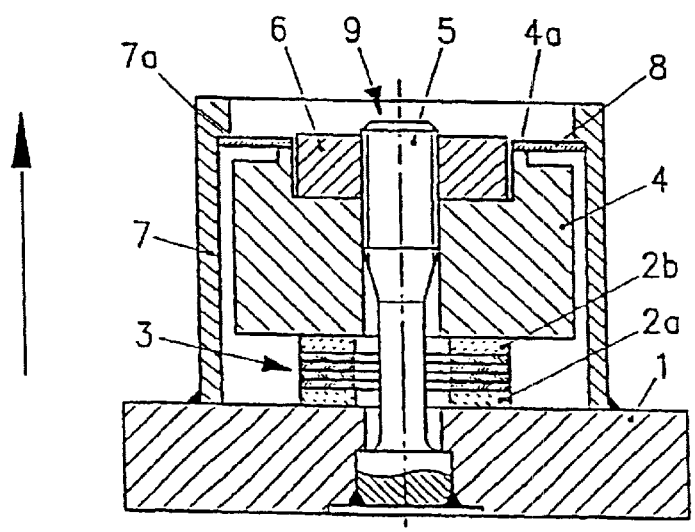
FIGS. 2a, 2b show two embodiments of compression mode accelerometers according to the invention.
Figure 2B:
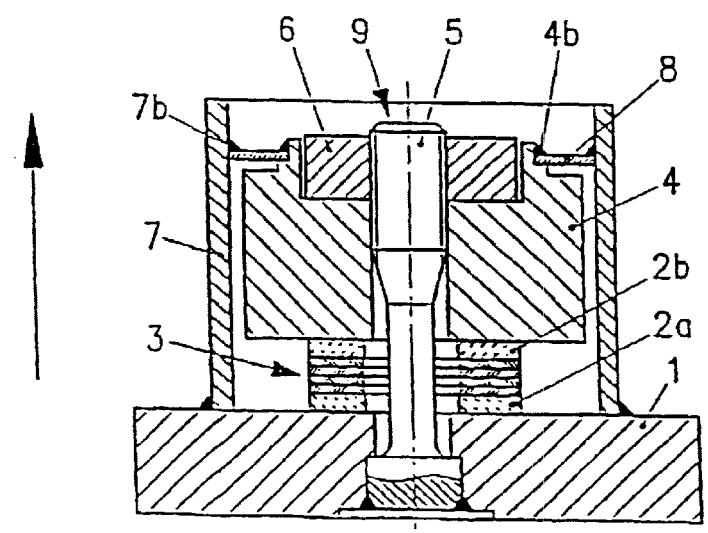
Figure 2C:
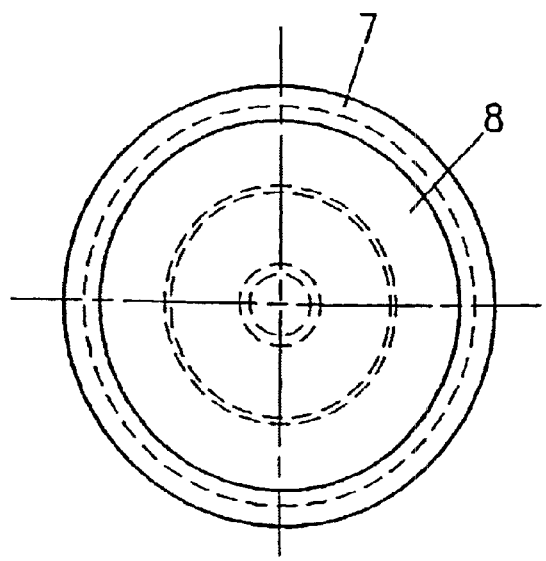
FIGS. 2c, 2d, 2e show variants of the embodiments shown by FIGS. 2a and 2b.
Figure 2D:
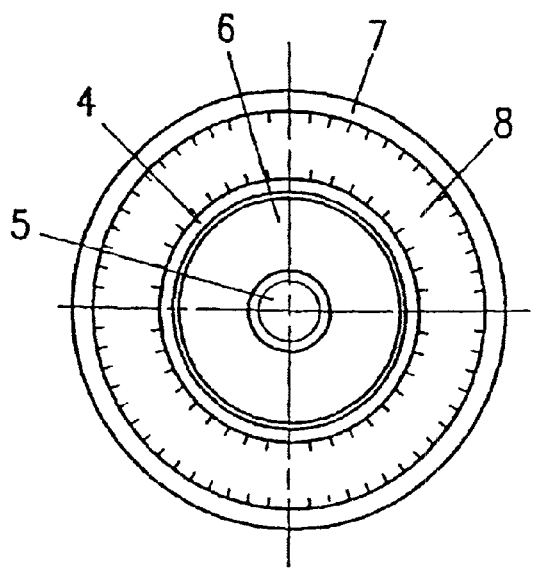
Figure 2E:
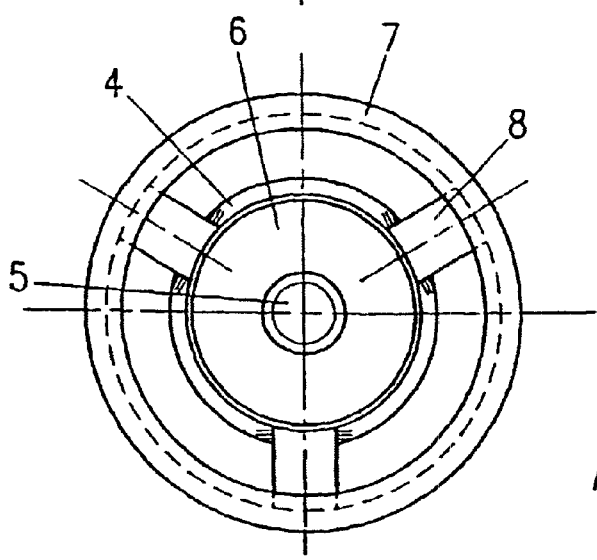

Two embodiments of compression mode accelerometers according to the present invention, are represented in FIG. 2a and 2b. These embodiments typically comprise the same parts as those shown in the known embodiment according to FIG. 1, but comprise an additional part, namely, a laterally stabilizing element 8 which is in contact with the electromechanical transducer 9 and a structural element 7. This structural element is rigidly fastened to the supporting base 1. In the most simple embodiment, the structural element 7 is part of the housing 7' of the accelerometer, and housing 7' is also rigidly fastened to the supporting base 1.

In the preferred embodiment of FIG. 2a, the laterally stabilizing element 8 is a simple cut-out from a metal sheet. An outer end part of this cut-out rests on a shoulder 7a machined in structural element 7 and an inner part of the latter cut-out touches the electromechanical transducer 9, for example at end part 4a of the seismic mass 4. The axial positions of resting points 7a and 4a on which the cut-out rests are selected in such a manner that the metal sheet which constitutes the laterally stabilizing element 8 is slightly deformed. This ensures that the laterally stabilizing element 8 is always in slight contact with shoulder 7a and resting point 4a.

In the preferred embodiment shown by FIG. 2b, the laterally stabilizing element 8 is welded or connected by any other means to the electromechanical transducer 9 and to structural element 7, respectively, for example to end part 4b of the seismic mass 4 and to point 7b of the structural element 7.

The laterally stabilizing element 8 may have the shape of a disk (represented in FIG. 2c), a ring (represented in FIG. 2d) or at least one bar (represented in FIG. 2e) that is arranged in radial direction and which connects electromechanical transducer 9 to structural element 7.

The preferred embodiments just described ensure a lateral stabilization of the electromechanical transducer as well as an additional damping of the bending resonance and allow to obtain a vibration signal that is free from noise under all conditions. It is important that laterally stabilizing element 8 is as rigid as possible in radial direction, but is as flexible as possible in axial direction, namely, in the sensitive direction of the piezoelectric elements. In this manner, lateral stabilization of the electromechanical transducer is obtained without influencing the axial behavior of the assembly.

Furthermore, all influences arriving through housing 7', such as acoustic noise, are not converted into an alteration of the vibration signal, because the laterally stabilizing element 8 cannot transmit any significant forces in axial direction.

Figure 3:
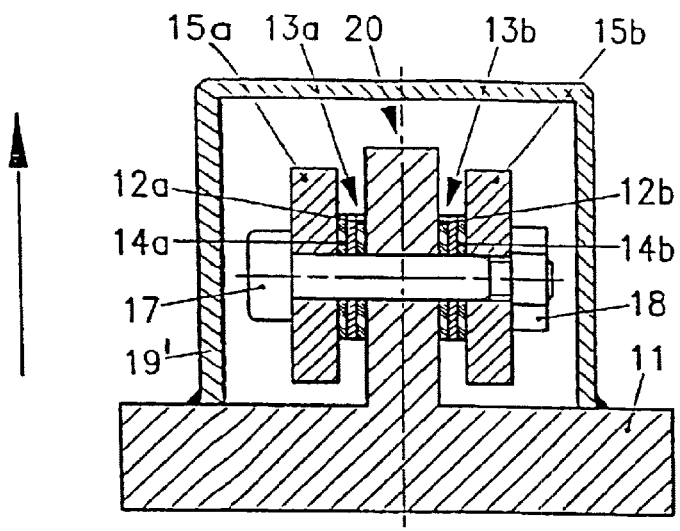
FIG. 3 shows the basic structure of a typical known piezoelectric accelerometer in shear mode.

FIG. 3 schematically shows the basic structure of a typical, known shear mode piezoelectric accelerometer. This accelerometer comprises an electromechanical transducer 20 which is fastened on a supporting base 11. The electromechanical transducer 20 comprises one or more sensitive elements 13a and 13b, each of them being formed by at least one piezoelectric elements mounted between two insulating elements 12a, 14a and 12b, 14b, respectively, seismic masses 15a and 15b mounted outside second insulating elements 14a and 14b, a central bolt 17 and a nut 18. The electrodes (not shown for sake of clarity) which serve for collecting electric charge are disposed between the piezoelectric elements. The electromechanical transducer 20 comprising the components just mentioned is fastened on the supporting base 11 by means of the central bolt 17 and the nut 18. The bolt 17 is prestressed for avoiding any displacement of the components of the electromechanical transducer 20 under all conditions of use. Instead of the prestressed bolt 17, the components of the electromechanical transducer 20 may also be glued, welded or fastened in any other suitable way. The electromechanical transducer 20 is mounted in a housing 19' which is rigidly fastened to the supporting base 11, e.g. by welding.

An accelerometer of the type represented in FIG. 3 is fastened through its supporting base 11 on the surface of an object by means of a fixation device (not shown) in order to measure vibrations of that surface.

Under the action of vibrations in the direction of the sensitive axis of the accelerometer, the seismic masses 15a and 15b generate shear forces on the piezoelectric elements which, in turn, generate electric charges representative of the measurement signal.

Under the action of vibrations in the direction perpendicular to the sensitive axis, the free end of the electromechanical transducer 20 will laterally in the direction of the excitation. The maximum bending stress experienced by the piezoelectric elements, may be very high and may lead to an important distortion of the vibration signal, in particular when the frequency of the vibration excitation coincides with the bending resonance frequency of the assembly.

Figure 4A:
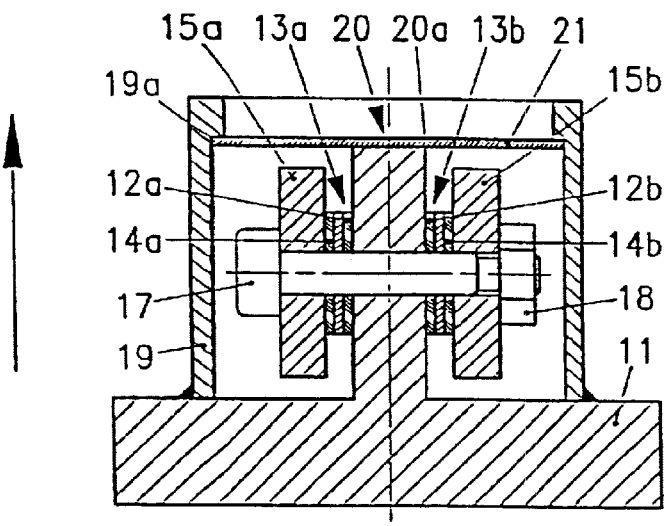
FIGS. 4a, 4b show two embodiments of shear mode accelerometers according to the invention.
Figure 4B:
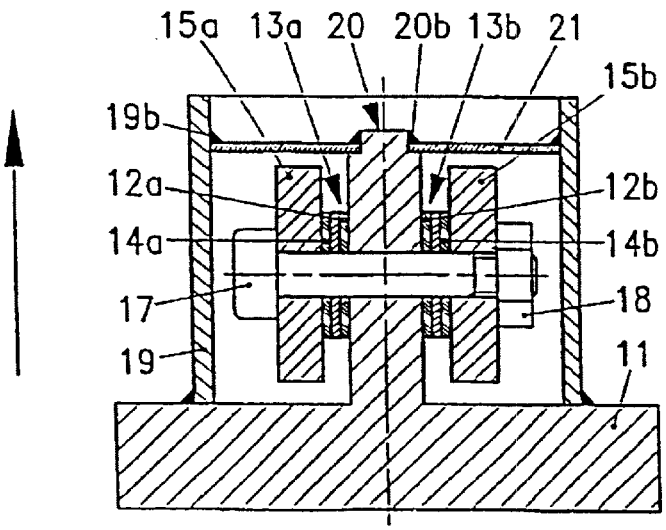
Figure 4C:
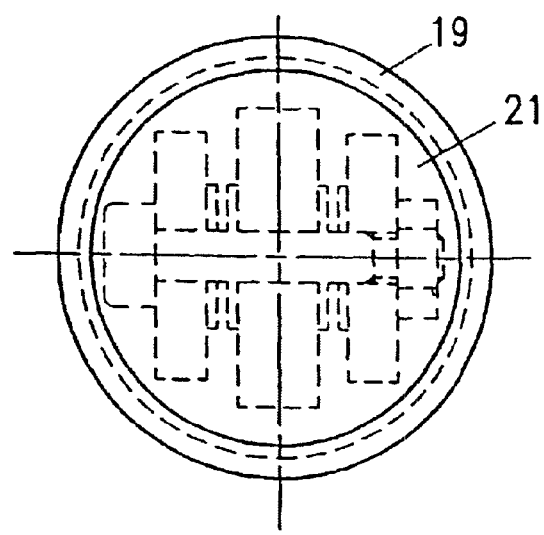
FIGS. 4c, 4d, 4e show variants of the embodiments shown by FIGS. 4a and 4b.
Figure 4D:
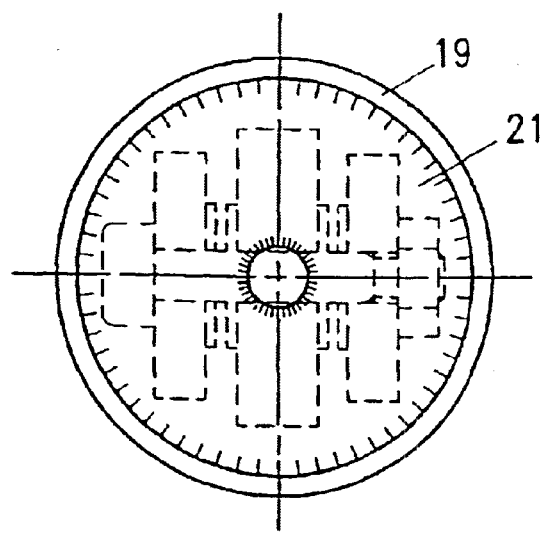
Figure 4E:
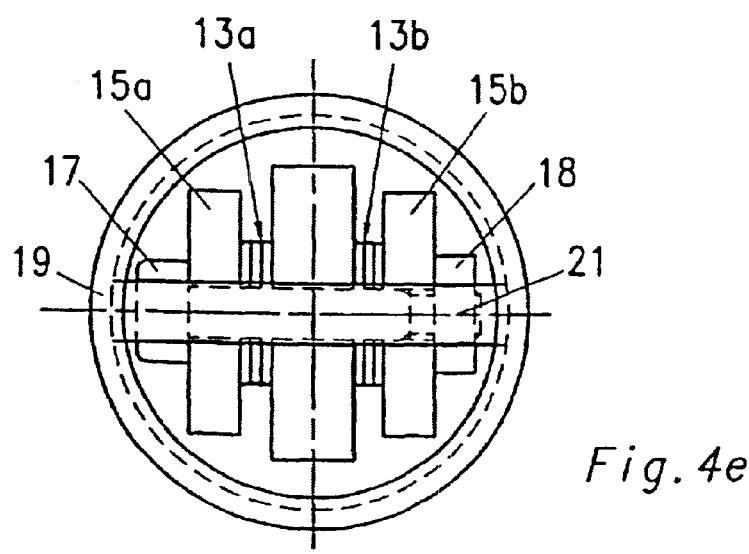
Figure 5:
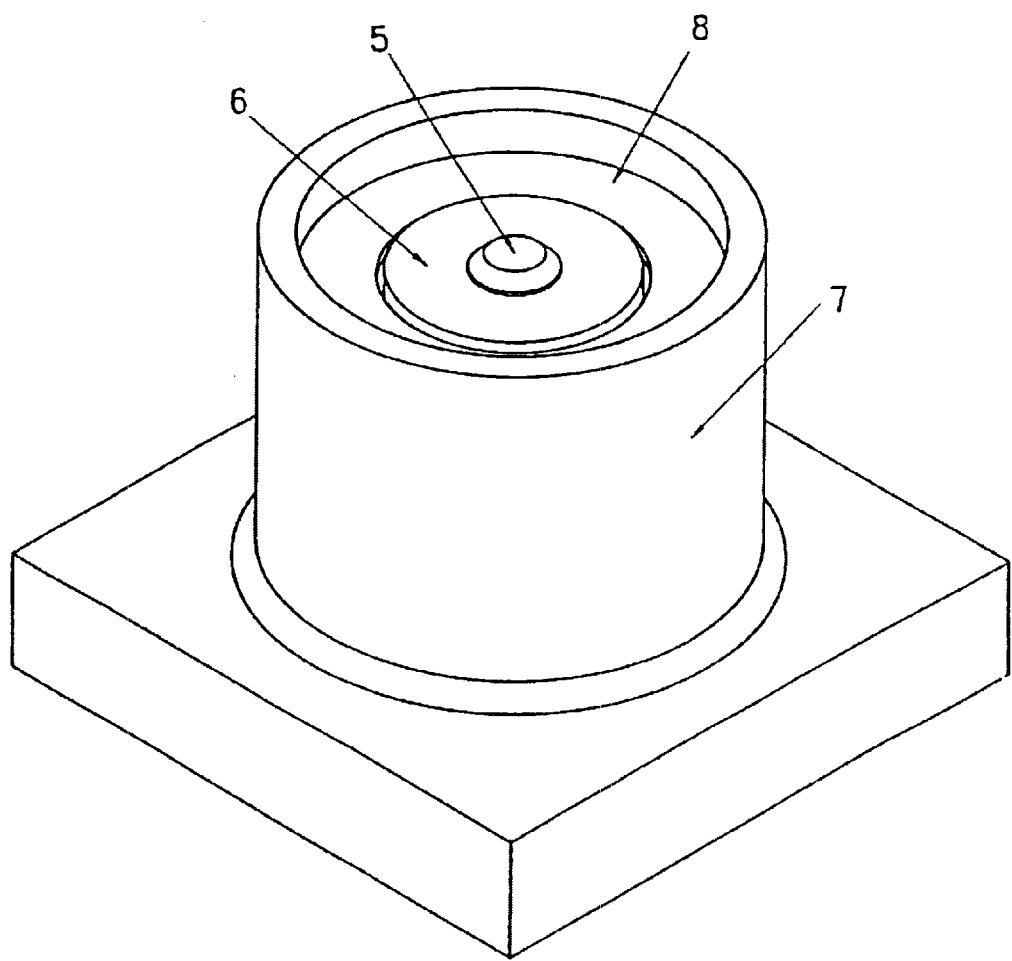
FIG. 5 shows a perspective view of an embodiment of the type described with reference to FIG. 2d.

Two embodiments of shear mode accelerometers according to the present invention are represented in FIG. 4a and 4b. These embodiments typically comprise the same parts as those shown in the known embodiment according to FIG. 3, but comprise an additional part, namely, a laterally stabilizing element 21 which is in contact with the electromechanical transducer 20 and a structural element 19. This structural element is rigidly fastened to supporting base 11. In the most simple embodiment, the structural element 19 is part of the housing 19' of the accelerometer, and housing 19' is also rigidly fastened to supporting base 11.

In the preferred embodiment shown in FIG. 4a, the laterally stabilizing element 21 is a simple cut-out from a metal sheet. An outer end part of this cut-out rests on a shoulder 19a machined in structural element 19 and a central part of that cut-out touches the electromechanical transducer 20, for example at its end part 20a. The axial positions of resting points 19a and 20a on which the cut-out rests are selected in such a manner that the metal sheet which constitutes the laterally stabilizing element 21 is slightly deformed. This ensures that the laterally stabilizing element 21 is always in slight contact with shoulder 19a and resting point 20a.

In the preferred embodiment of FIG. 4b, the laterally stabilizing element 21 is welded or connected by any other means to the electromechanical transducer 20 and to the structural element 19, respectively, for example to its end part 20b and to point 19b of the structural element 19.

The laterally stabilizing 21 may be formed by a disk (represented in FIG. 4c), a ring (represented in FIG. 4d) or at least one bar (represented in FIG. 4e) that is arranged substantially in radial direction and connects the electromechanical transducer 20 to the structural element 19.

Structural element 7, 19 has preferably the shape of a symmetric cylinder (see FIGS. 2a, 2b, 4a, 4b, 5) having a diameter, and thus a moment of inertia, greater than that of the bolt 5, 17 in order to obtain a symmetrical and efficient stabilizing effect.

The preferred embodiments just described ensure a lateral stabilization of the electromechanical transducer as well as an additional damping of the bending resonance and allow to obtain a vibration signal that is free from noise under all conditions. It is important that the laterally stabilizing element 21 is as rigid as possible in radial direction, but is as flexible as possible in axial direction, namely, in the sensitive direction of the piezoelectric elements. In this manner, the lateral stabilization of the electromechanical transducer is obtained without influencing the axial behavior of the assembly.

Furthermore, all influences arriving through the housing 19', such as acoustic noise, are not converted into an alteration of the vibration signal, because the laterally stabilizing element 21 cannot transmit any significant forces in axial direction.

The present invention may thus be also applied with benefit to piezoelectric accelerometers that are constructed for working in the shear mode and allows to avoid or at least to radically reduce the alteration effect of the vibration signal mentioned above.

Modifications and alternative embodiments of the above described embodiments of an accelerometer according to the invention will be apparent to those skilled in the art in view of the foregoing description. Accordingly, this description is to be construed as illustrative only and is for the purpose of teaching those skilled in the art the best mode of carrying out the invention. Details of the accelerometer may be varied substantially without departing from the spirit of the invention and the exclusive use of all modifications which come within the scope of the appended claims is reserved.

What is claimed is:

1. An accelerometer to measure acceleration of a body, the accelerometer compflsing:
   (a) a supporting base;
   (b) at least one electromechanical transducer mechanically coupled lo said supporting base and operable to produce an electrical signal in accordance with acceleration of the body, said electromechanical transducer including:
      (b.1) at least one sensitive element having a sensing axis comprising at least one piezoelectric element,
      (b.2) at least one seismic mass positioned to apply force to said sensitive element in response to acceleration of said body to cause said piezoelectric element to generate an electrical signal in accordance with acceleration of said body;
   (c) a structural element connected to said supporting base, and
   (d) at least one laterally stabilizing element mechanically coupled to said electromechanical transducer and to said structural element, said stabilizing element being configured and positioned to stabilize said electromechanical transducer in a direction transverse to said sensing axis of said piezoelectric element by blocking said seismic mass from displacing in a direction transverse to said sensing axis of said piezoelectric element.

2. The accelerometer according to claim 1, wherein said laterally stabilizing element has a greater rigidity in said direction transverse to said sensing axis of said piezoelectric element than in said direction parallel to said sensing axis of said piezoelectric element.

3. The accelerometer according to claim 1, further comprising:
   a housing mechanically coupled to said supporting base, said structural element forming at least a portion of said housing.

4. The accelerometer according to claim 1, wherein said laterally stabilizing element includes a first part and a second part, said structural element includes a shoulder, said first part of said laterally stabilizing element resting on said shoulder of said structural element, and said second part of said laterally stabilizing element mechanically contacting said electromechanical transducer.

5. The accelerometer according to claim 4, wherein said first part and said second part of said laterally stabilizing element are slightly deformed to maintain the mechanical contact with said electromechanical transducer.

6. The accelerometer according to claim 1, wherein said laterally stabilizing element is formed from a metal sheet.

7. The accelerometer according to claim 1, wherein said laterally stabilizing element is ring shaped.

8. The accelerometer according to claim 1, wherein said laterally stabilizing element is disk shaped.

9. The accelerometer according to claim 1, wherein said laterally stabilizing element includes at least one bar arranged transversely with respect to said sensing axis of said piezoelectric element.

10. The accelerometer according to claim 4, wherein said first part of said laterally stabilizing element is mechanically coupled to said structural element, and said second part of said laterally stabilizing element is mechanically coupled to said electromechanical transducer.

11. The accelerometer according to claim 1, wherein said structural element is cylindrically shaped and surrounds said seismic mass.

12. An accelerometer to measure acceleration of a body, the accelerometer comprising:

(a) a supporting base;
(b) at least one electromechanical transducer mechanically coupled to said supporting base and operable to produce an electrical signal in accordance with acceleration of said body, said electromechanical transducer including:
   (b.1) at least one sensitive element having at least one piezoelectric element, said piezoelectric element having a sensing axis, and
   (b.2) at least one seismic mass positioned to apply force to said sensitive element in response to acceleration of said body to cause said piezoelectric element to generate said electrical signal in accordance with acceleration of said body;
(c) a fastening arrangement fastening said electromechanical transducer on said supporting base; and preventing motion between said fastening arrangement and said electromechanical transducer;
(d) a structural element mechanically coupled to said supporting base; and
(e) at least one laterally stabilizing element mechanically coupled to said electromechanical transducer and to said structural element, said stabilizing element being configured to stabilize said electromechanical transducer in a direction transverse to said sensing axis of said piezoelectric clement by blocking said seismic mass from displacing in a direction transverse to said sensing axis of said piezoelectric element.

13. The accelerometer according to claim 12, wherein said laterally stabilizing element has a greater rigidity in said direction transverse to said sensing axis of said piezoelectric element than in said direction parallel to said sensing axis of said piezoelectric element.

14. The accelerometer according to claim 12, further comprising:
   a housing mechanically coupled to said supporting base, said structural element forming at least a portion of said housing.

15. The accelerometer according to claim 12, wherein said laterally stabilizing element includes a first part and a second part, said structural clement includes a shoulder, said first part of said laterally stabilizing element resting on said shoulder of said structural element, arid said second part of said laterally stabilizing clement mechanically contacting said electromechanical transducer.

16. The accelerometer according to claim 15, wherein said first part and said second part of said laterally stabilizing element are slightly deformed to maintain the mechanical contact with said electromechanical transducer.

17. The accelerometer according to claim 12, wherein said laterally stabilizing element is formed from a metal sheet.

18. The accelerometer according to claim 12, wherein said laterally stabilizing element is ring shaped.

19. The accelerometer according to claim 12, wherein said laterally stabilizing element is disk shaped.

20. The accelerometer according to claim 12, wherein said laterally stabilizing element includes at least one bar arranged transversely with respect to said sensing axis of said piezoelectric element.

* * * * *

UNITED STATES PATENT AND TRADEMARK OFFICE
CERTIFICATE OF CORRECTION

PATENT NO. : 6,655,211 B1
DATED : December 2, 2003
INVENTOR(S) : Schmid et al.

It is certified that error appears in the above-identified patent and that said Letters Patent is hereby corrected as shown below:

Column 6,
Line 3, please change "compflsing" to -- comprising --.
Line 6, please change "lo" to -- to --.

Column 7,
Line 16, please change, "base;" to -- base --.

Column 8,
Line 13, please change, "arid" to -- and --.
Line 14, please change, "clement" to -- element --.

Signed and Sealed this

Twenty-ninth Day of June, 2004

JON W. DUDAS
*Acting Director of the United States Patent and Trademark Office*